July 26, 1966     K. RAWALD ET AL     3,263,061

POLE MOUNTED ELECTRIC HEATER DEVICE

Filed Aug. 23, 1963

INVENTORS
KENNETH RAWALD
KARL J. FLEMING
JOHN T. RIETZ
BY

*Edward A. Sokolski*

ATTORNEY

United States Patent Office 3,263,061
Patented July 26, 1966

3,263,061
POLE MOUNTED ELECTRIC HEATER DEVICE
Kenneth Rawald, 223 N. Siesta, Anaheim, Calif.; Karl J. Fleming, Santa Ana, and John T. Rietz, Los Angeles, Calif.; said Rietz and said Fleming assignors to said Rawald
Filed Aug. 23, 1963, Ser. No. 304,171
3 Claims. (Cl. 219—343)

This application relates to a heater device and more particularly to such a device suitable for portable installation.

Portable electric heaters are used quite extensively to supplement normal permanent heating installations and to provide heat in areas where no permanent heating fixtures are available. Such portable units generally are supported on a small stand which is rested on the floor. This stand is generally not attached to the floor or wall and the heater is therefore subject to be knocked over accidentally. Further, such heater units present a hazard of fire and personal injury. This hazard is especially great where small children are involved. Such portable heaters of the prior art also tend to take up floor space and generally do not fit in with the overall decor of the room.

The device of this invention overcomes the shortcomings of the prior art in providing a portable heater which is rigidly suspended between the floor and ceiling on a pole. The heater unit is mounted fairly high on the pole, out of the reach of small children and generally offering minimum obstruction, at a height for optimum heating action. The heater unit can readily be positioned in a corner of a room where it occupies little usable floor space. The device of the invention can easily be installed and removed yet has the characteristics of a permanent installation.

It is therefore an object of this invention to provide an improved portable heater.

It is another object of this invention to provide a portable heater which radiates out heat an an optimum height.

It is a further object of this invention to provide a portable heater which has characteristics of a permanently installed heater.

It is still a further object of this invention to provide a portable heater with which the hazard of injury is minimized.

It is still another object of this invention to provide an improved portable heater of simple construction and economical fabrication.

Figure 2:
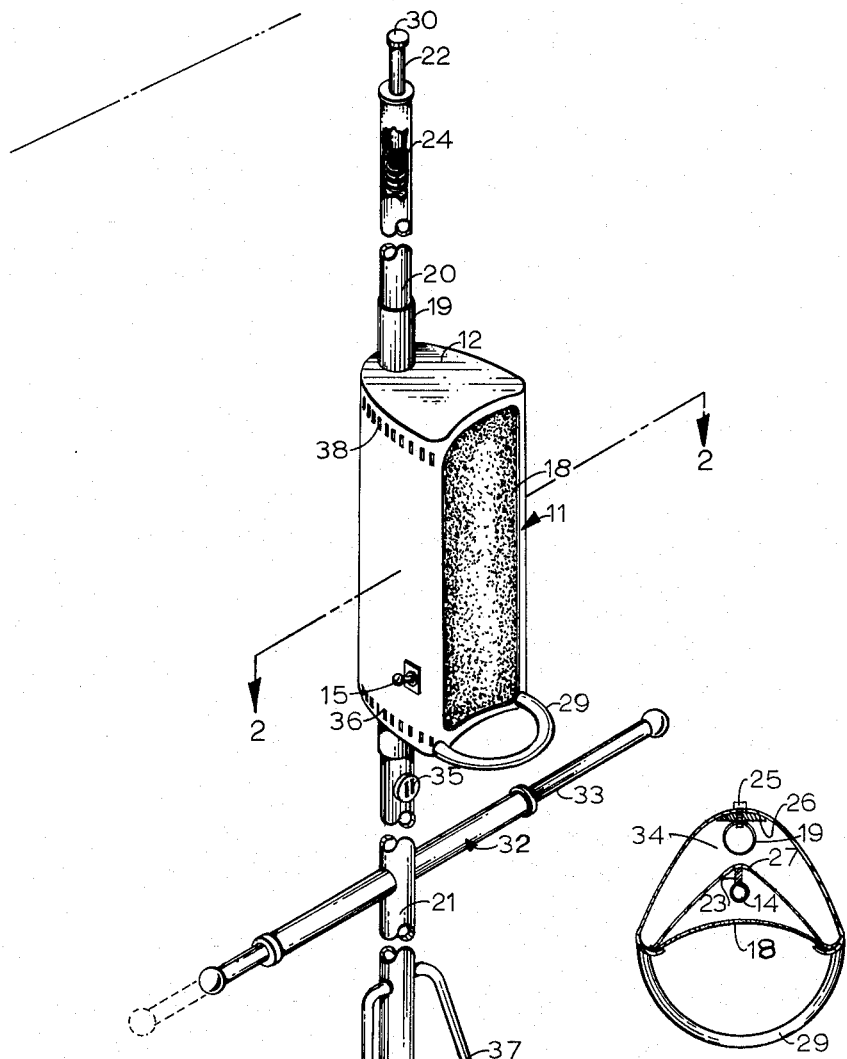
Figure 1:
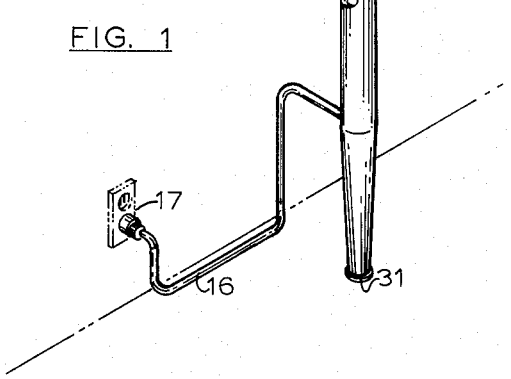

Other objects of this invention will become apparent from the following description taken in connection with the accompanying drawings of which, FIG. 1 illustrates a preferred embodiment of the device of the invention, and FIG. 2 is a cross-sectional view taken along the plane indicated by the line 2—2 in FIG. 1.

Referring now to the figures, heater unit 11 includes a case 12 within which is contained an electrical heating element 14. Heating element 14, which may comprise an open wound coil of Nichrome wire is mounted on insulator 23. Heating element 14 is connected to power cord 16 through switch 15 and is energized by means of the switch. If desired, a thermostatic cut-off switch may be interposed in the heater circuit to cut off the power thereto should the heat become excessive. Power cord 16 is plugged into an ordinary electrical outlet 17.

In the front of case 12 is a curved grill 18. Insulator 23 on which heating element 14 is mounted is fixedly attached to reflector 27 by any suitable means. Reflector 27 is fixedly attached to the front of case 12. Reflector 27, which is generally parabolic in shape and fabricated of highly reflective material such as polished aluminum, reflects the heat from heating element 14 outwardly through grill 18 and thereby concentrates the heat energy in this direction.

An air space 34 is formed between the back of case 12 and reflector 27. Air enters space 34 through slots 36, formed in the bottom portion of case 12 and exits from this space through slots 38 formed in the top of the case. A cooling airstream is thus passed through the back of the case by "chimney" action to keep the temperature of the case down.

The heater unit 11 is supported on pole sections 19, 20, and 21. Pole section 19 is attached to the back of case 12 (as shown in FIG. 2) by means of machine screws 25. A spacer 26 is interposed between the pole section and each screw to provide more secure holding action. Pole section 19 runs through the entire length of case 12 and protrudes therefrom through round apertures formed in the top and bottom ends of the case. Top pole section 20 and bottom pole section 21 telescope into pole section 19 in a press fit to integrally join therewith. The utilization of three pole sections facilitates the packing and shipping of the device.

Slidably mounted within hollow pole section 20, in substantial concentricity therewith is rod 22. Rod 22 is urged upwardly out of pole section 20 by spring 24. At the end of rod 22 is a resilient bumper 30. A similar resilient bumper 31 is fixedly attached to the end of pole section 21. With the heater device installed, rod 22 is urged away from pole section 20 by spring 24 with bumper 30 abuting against the ceiling and bumper 31 abutting against the floor as indicated in FIG. 1.

Fixedly attached to the bottom end of case 12 is a guard ring 29. This guard ring will prevent the front portion of the heater from coming into contact with the floor should the unit negligently be placed in or dropped to such a position while in a heated condition.

An electrical outlet 35 is mounted on pole section 19. This electrical outlet is connected to power cord 16, and may be utilized for accessories such as electric razors. Attached to pole section 21 is a rack 32. Rack 32 has telescoping sections 33 thereon. Rack 32 may be utilized for suspending clothing or towels. A ring type rack 37 is also attached to pole section 21. This rack is generally suitable for hanging washcloths or towels.

The device of the invention can readily be installed and removed by grabbing pole section 21 and pushing against the ceiling until rod 22 telescopes well within pole section 20. At this point, pole section 21 will push with little or no force against the floor and it will be possible to readily slide pole section 21 either in or out as the case may be.

The device of this invention thus provides a simple yet highly effective portable heater. The installation of such heater can be accomplished in a few moments, yet the installed heater has the stability of a permanent installation. The heater unit itself is maintained high off the floor in a position for efficient heating action where the hazard of fire or personal injury is minimized.

While the invention has been described and illustrated in detail, it is to be clearly understood that this is intended by way of illustration and example only and is not to be taken by way of limitation, the spirit and scope of the invention being limited only by the terms of the following claims.

We claim:
1. In a heater device suitable for mounting between floor and ceiling,
a heater unit, said heater unit including an elongated curved case, said case having substantially flat top and bottom portions, said top and bottom portions having apertures formed therein, a curved grill forming the front portion of said case, a substantially parabolically shaped reflector running the length of said case and fixedly attached to the sides of the front portion of said case, an air space being formed between said reflector and the back of said case, the top and bottom portions of the back of said case having venting slits formed therein, an insulator fixedly attached to said reflector, a heating element fixedly attached to said insulator, and switch means for controlling said heating element, a first hollow pole section enclosed within said case and fixedly attached to the back portion thereof, said pole section protruding through the apertures formed in the top and bottom portions of said case, a second pole section telescopically fitted into the bottom of said first pole section, a third pole section telescopically fitted into the top of said first pole section, a rod slidably mounted in one of said second and third pole sections, spring means for urging said rod out of said one of said pole sections, and a pair of resilient bumpers, one of said bumpers being attached to the end of said rod the other of said bumpers being attached to the extreme end of the other of said second and third pole sections, whereby one of said bumpers abuts against the floor and the other of said bumpers abuts against the ceiling and said heater device is firmly held therebetween.

2. The heater device as recited in claim 1 wherein said rod is mounted in said third pole section.

3. The device as recited in claim 1 and additionally including a guard ring fixedly attached to the front portion of said case.

References Cited by the Examiner

UNITED STATES PATENTS

| | | | |
|---|---|---|---|
| 1,096,927 | 5/1914 | Kuhn | 219—347 X |
| 1,418,671 | 6/1922 | Patterson | 219—343 |
| 2,234,373 | 3/1941 | Gough | 219—346 X |
| 2,493,125 | 1/1950 | Foster | 219—347 X |
| 2,495,513 | 1/1950 | Doyle | 219—347 X |
| 2,745,949 | 5/1956 | Borin | 240—81 |
| 2,922,031 | 1/1960 | Stiffel | 240—81 |

RICHARD M. WOOD, *Primary Examiner.*

R. F. STAUBLY, *Assistant Examiner.*